US012228389B2

United States Patent
Kobayashi

(10) Patent No.: US 12,228,389 B2
(45) Date of Patent: Feb. 18, 2025

(54) UNDERWATER ORGANISM IMAGING AID SYSTEM, UNDERWATER ORGANISM IMAGING AID METHOD, AND STORAGE MEDIUM

(71) Applicant: NEC Corporation, Tokyo (JP)

(72) Inventor: Jun Kobayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 343 days.

(21) Appl. No.: 17/784,225

(22) PCT Filed: Dec. 26, 2019

(86) PCT No.: PCT/JP2019/051082
§ 371 (c)(1),
(2) Date: Jun. 10, 2022

(87) PCT Pub. No.: WO2021/130950
PCT Pub. Date: Jul. 1, 2021

(65) Prior Publication Data
US 2023/0045358 A1   Feb. 9, 2023

(51) Int. Cl.
*G01B 11/04* (2006.01)
*G06T 7/62* (2017.01)
*G06T 7/80* (2017.01)

(52) U.S. Cl.
CPC .............. *G01B 11/043* (2013.01); *G06T 7/62* (2017.01); *G06T 7/80* (2017.01)

(58) Field of Classification Search
None
See application file for complete search history.

(56) References Cited

U.S. PATENT DOCUMENTS

| | | | | |
|---|---|---|---|---|
| 2020/0027231 | A1* | 1/2020 | Kitagawa | G06T 7/001 |
| 2021/0329891 | A1* | 10/2021 | Kozachenok | A01K 61/95 |
| 2022/0004760 | A1* | 1/2022 | Kozachenok | A01K 61/80 |

FOREIGN PATENT DOCUMENTS

| | | | |
|---|---|---|---|
| CN | 104931091 A | * | 9/2015 |
| CN | 104967833 A | * | 10/2015 |
| CN | 104996370 A | * | 10/2015 |
| CN | 105028356 A | * | 11/2015 |
| CN | 105028357 A | * | 11/2015 |
| CN | 105046228 A | * | 11/2015 |
| JP | 2014-017865 A | | 1/2014 |

(Continued)

OTHER PUBLICATIONS

International Search Report for PCT Application No. PCT/JP2019/051082, mailed on Mar. 24, 2020.

(Continued)

*Primary Examiner* — Jiangeng Sun

(57) ABSTRACT

An underwater organism imaging aid system according to an aspect of the present disclosure includes, at least one memory configured to store instructions, and at least one processor configured to execute the instructions to: detect an underwater organism from an image acquired by a camera, determine a positional relationship between the underwater organism detected and the camera, and output auxiliary information for moving the camera in such a way that a side face of the underwater organism and an imaging face of the camera face each other based on the positional relationship.

14 Claims, 15 Drawing Sheets

(56) References Cited

FOREIGN PATENT DOCUMENTS

JP 2017-181766 A 10/2017
WO WO-2019045089 A1 * 3/2019 ............. G01B 11/02
WO 2019/188506 A1 10/2019

OTHER PUBLICATIONS

English translation of Written opinion for PCT Application No. PCT/JP2019/051082, mailed on Mar. 24, 2020.

* cited by examiner

UNDERWATER ORGANISM IMAGING AID SYSTEM, UNDERWATER ORGANISM IMAGING AID METHOD, AND STORAGE MEDIUM

This application is a National Stage Entry of PCT/JP2019/051082 filed on Dec. 26, 2019, the contents of all of which are incorporated herein by reference, in their entirety.

TECHNICAL FIELD

The present invention relates to an underwater organism imaging aid device or the like that captures an image of an underwater organism in order to estimate the size of the underwater organism.

BACKGROUND ART

There is a need to develop a system for monitoring underwater organisms. Such a system estimates the size of underwater organisms (for example, fish) grown in the cage to determine the time of shipment, or detects the state of underwater organisms growing in the sea, river, and the like. PTL 1 discloses a technique related to estimation of a length of fish. PTL 2 discloses a technique for automatically tracking a fish group.

CITATION LIST

Patent Literature

[PTL 1] WO 2019/045089 A
[PTL 2] JP 2017-181766 A

SUMMARY OF INVENTION

Technical Problem

PTL 1 discloses a technique of specifying a fish body in a rectangular region in an image in which a plurality of fish is imaged, specifying spatial coordinates of feature parts (head and tail of the fish body) of the specified fish body, and detecting a distance in the spatial coordinates to calculate a length of the fish body. PTL 2 discloses a technique in which, when a user sets a target to be monitored by viewing an underwater monitoring video, an underwater monitoring device automatically tracks a group of fish to be monitored. However, neither of them discloses how to capture a fish image suitable for estimating the size.

The present disclosure has been made in view of the above problems, and an object of the present disclosure is to provide an underwater organism imaging aid device or the like for capturing a fish image suitable for estimation when estimating the size of an underwater organism.

Solution to Problem

In view of the above problems, an underwater organism imaging aid device according to a first aspect of the present disclosure includes
a detection means configured to detect an underwater organism from an image acquired by a camera,
a determination means configured to determine a positional relationship between the underwater organism detected by the detection means and the camera, and
an output means configured to output auxiliary information for moving the camera in such a way that a side face of the underwater organism and an imaging face of the camera face each other based on the positional relationship.

An underwater organism imaging system according to a second aspect of the present disclosure includes
an underwater organism imaging aid device described above,
a camera configured to capture an underwater image, and
a display device configured to display auxiliary information for imaging a side face of an underwater organism, the auxiliary information being configured to be output by the underwater organism imaging aid device.

An underwater organism imaging aid method according to a third aspect of the present disclosure includes
detecting an underwater organism from an image acquired by a camera,
determining a positional relationship between the detected underwater organism and the camera, and
outputting auxiliary information for moving the camera in such a way that a side face of the underwater organism and an imaging face of the camera face each other based on the positional relationship.

An underwater organism imaging program according to a fourth aspect of the present disclosure causes a computer to execute
detecting an underwater organism from an image acquired by a camera,
determining a positional relationship between the detected underwater organism and the camera, and
outputting auxiliary information for moving the camera in such a way that a side face of the underwater organism and an imaging face of the camera face each other based on the positional relationship.

The underwater organism imaging program may be stored in a non-transitory computer-readable/writable storage medium.

Advantageous Effects of Invention

The present invention can provide an underwater organism imaging aid device or the like for capturing a fish image suitable for estimation when estimating the size of an underwater organism.

EXAMPLE EMBODIMENT

Figure 1:
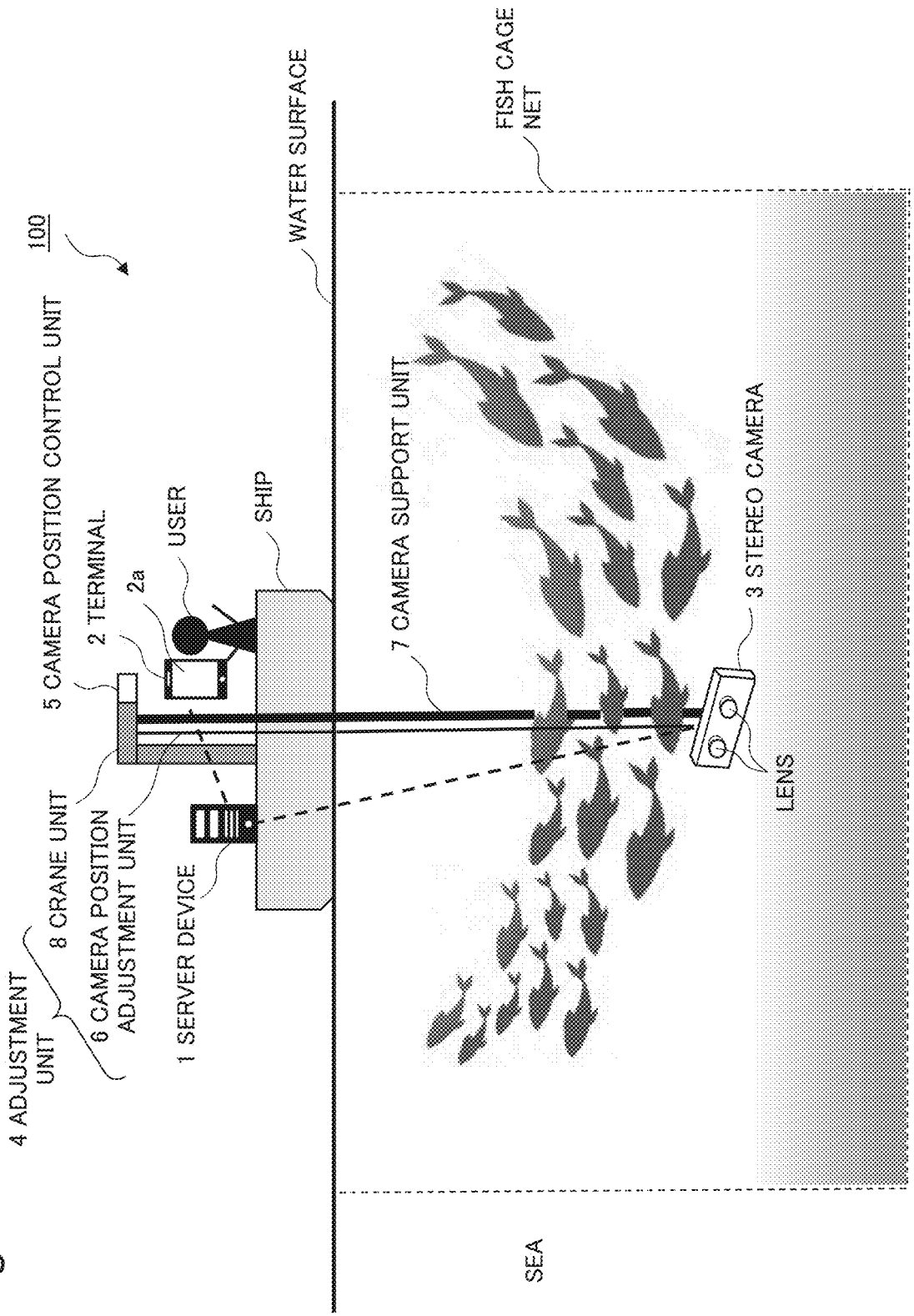
FIG. 1 is a block diagram illustrating a configuration example of an underwater organism imaging system according to a first example embodiment of the present disclosure.

Although it is difficult to observe underwater organisms that inhabit the sea and the river unlike terrestrial organisms, it may be necessary to observe them underwater. For example, in fish aquaculture, observation of fish in a cage in aquaculture and estimation of the size are necessary for determining the time of catching fish and the amount of feeding. Here, the underwater organism refers to a creature that inhabits in the water, such as fish and crustaceans. In the following example embodiments, fish will be described as an example.

In estimating the size of a fish in water, it is important to capture an image of a side face of the fish including feature points required for estimating the size of the fish in the longitudinal direction, for example, a mouth tip, a caudal fin base, and the like with a camera. In order to estimate the size more accurately, it is important to use a facing image of a side face of the fish imaged in a state where a distances from each of a plurality of feature points including at least a feature point (for example, a mouth tip) indicating one end portion in one direction of a fish facing one direction in an image and a feature point indicating another end portion (for example, a caudal fin base) to a camera (lens surface) to perform imaging is made to as equal as possible, and the side face of the fish and the camera imaging face each other. Therefore, in the example embodiment of the present disclosure, the position of the camera is adjusted in such a way that the facing image of the side face of the fish can be captured, that is, the side face of the fish and the imaging face of the camera face each other or substantially face each other. For example, the position and posture of the camera are adjusted until the optical axis of the camera and the side face of the fish perpendicularly or substantially perpendicularly intersect each other. For example, the position and posture of the camera are adjusted until the direction of the optical axis of the camera and the direction in which the fish travels perpendicularly or substantially perpendicularly intersect each other. At this time, it is preferable that the entire side face of the fish is included in the captured image of the camera. However, even in a case where the entire side face of the fish is not shown, for example, even in a case where part of the fish body overlaps another fish body, the position and posture of the camera can be adjusted as long as the feature point of the target fish can be detected in the image.

The fish that swim in the cage include fish having a habit of migrating in one direction in a group, such as tuna and yellowtail. Once the camera can be adjusted in such a way as to be disposed at a position where the side face of the fish body and the imaging face of the camera face each other, it is possible to capture an image (video) in which side faces of many fish bodies are captured in one image. That is, since a group of fish has a habit of continuously migrating at the same position for a while, for example, for several minutes unless a specific stimulus is given, image data sufficient for estimating the sizes of the fish in the cage can be obtained once the camera position can be correctly adjusted. By estimating the size of the fish using the size estimation model created by learning based on the images of these side faces, it is possible to estimate the sizes of the fish in the water with higher accuracy.

In each example embodiment of the present disclosure, a method for capturing a fish image suitable for estimation when estimating the size of an underwater organism.

Next, each example embodiment will be described in detail with reference to the drawings. In the following description of the drawings, the same or similar parts are denoted by the same or similar reference numerals. However, the drawings schematically illustrate a configuration in the example embodiment of the present invention. Further, the example embodiment of the present invention described below is an example, and can be appropriately changed within the same essence.

First Example Embodiment (Underwater Organism Imaging System)

Hereinafter, an underwater organism imaging system 100 according to a first example embodiment of the present disclosure will be described with reference to the drawings.

FIG. 1 is a diagram illustrating a schematic configuration of the underwater organism imaging system 100. As illustrated in FIG. 1, the underwater organism imaging system 100 includes a server device 1, a terminal 2, a stereo camera 3, an adjustment unit 4, a camera position control unit 5, and a camera support unit 7. The adjustment unit 4 includes a camera position adjustment unit 6 and a crane unit 8. The server device 1 and the terminal 2, and the server device 1 and the stereo camera 3 are connected in such a way as to be capable of wired communication or radio communication.

The overall flow of the imaging operation of the underwater organism imaging system 100 will be described. The stereo camera 3 captures an image of the fish in the water. The server device 1 acquires an image of the fish from the stereo camera 3 to generate auxiliary information for making a side face of the fish face an imaging face of the camera. The auxiliary information is information for presenting to the user (controller) of the stereo camera 3 an instruction for moving the stereo camera 3 in such a way that the side face of the fish and the imaging face of the stereo camera 3 face each other. The users (controllers) of the stereo camera 3 are a person who operates the stereo camera 3, a person who operates the crane unit 8 for imaging, a person who operates the adjustment unit 4 of the camera, and the like. These persons may be the same person or different persons. Since the fish group freely moves in the cage, the fish may be captured when the depth, the vertical angle, the horizontal angle, and the like of the stereo camera 3 are adjusted at a predetermined position on the sea, or the fish may not be captured if the ship or the crane unit 8 is not moved to detect the fish in a wide area. The auxiliary information includes information in any case. Note that an underwater drone equipped with the stereo camera 3 may be used to move underwater, and the posture or the like of the stereo camera 3 may be appropriately adjusted to capture the fish. At this time, the auxiliary information includes information to be presented to a person who operates the underwater drone or information to be output to a computer that operates the underwater drone.

The server device 1 transmits the image of the fish and the auxiliary information to the terminal 2. The terminal 2 is a portable communication terminal of the user who images the fish, and displays the image of the fish and the auxiliary information on the display unit 2a when the image of the fish and the auxiliary information are received from the server device 1. While viewing the displayed image of the fish and the auxiliary information, the user moves the stereo camera 3 up, down, left, and right or adjusts the posture of the stereo camera 3 to a position where the side face of the fish and the imaging face of the camera face each other. This process is repeated until the side face of the fish and the imaging face of the camera face each other.

When the stereo camera 3 captures a facing image of the side face of the fish for a predetermined time required for estimating the size of the fish in the cage at a position where the side face of the fish and the imaging face of the camera face each other, the server device 1 starts a size estimation process based on the captured image data. Note that the size estimation process may be executed by a server device other than the server device 1. The size estimation process may be executed simultaneously with the imaging of the image data, or may be executed at any time after the imaging. Although the server device 1 is disposed on the ship in FIG. 1, the server device 1 may be disposed at another place where wired or wireless communication is possible. The terminal 2 may have all or some of the functions of the server device 1. That is, the terminal 2 may acquire the image of the fish from the stereo camera 3, generate the auxiliary information for making the side face of the fish face the imaging face of the camera, and display them. Furthermore, the terminal 2 may display the fish size estimation result on the display unit 2a.

Each component illustrated in FIG. 1 will be described below.

The stereo camera 3 is a camera that acquires an image of the fish under water, and also has a function as a distance sensor. The stereo camera 3 simultaneously images a subject (three-dimensional object) from two different directions using two lenses disposed at a predetermined distance, thereby calculating information such as a depth distance from the camera to the subject from position information of pixels in an image captured by each camera based on a triangulation method. Note that a camera other than the stereo camera 3 may be used as long as the camera can acquire the depth distance to the subject. A camera that acquires image information and a sensor that can acquire information such as a depth distance may be separately provided.

The stereo camera 3 includes the adjustment unit 4 (the crane unit 8 and the camera position adjustment unit 6). The adjustment unit 4 executes at least one of vertical or substantially vertical movement of the stereo camera 3 with respect to the water surface, horizontal or substantially horizontal movement with respect to the water surface, horizontal or substantially horizontal rotation with respect to the water surface, and vertical or substantially vertical rotation with respect to the water surface under the water surface. Specifically, the crane unit 8 executes vertical or substantially vertical movement of the stereo camera 3 with respect to the water surface and horizontal or substantially horizontal movement with respect to the water surface. The camera position adjustment unit 6 executes horizontal or substantially horizontal rotation with respect to the water surface and vertical or substantially vertical rotation with respect to the water surface.

The stereo camera 3 is attached to the camera support unit 7 and sunk in the water. The camera support unit 7 is a support material for disposing the stereo camera 3 at a predetermined position in water for a predetermined time. Specifically, the camera support unit 7 is preferably one that is hardly affected by waves, for example, a metal rod or a rope having a certain degree of hardness and thickness. The camera support unit 7 is provided with a fixture for fixing the stereo camera 3.

The crane unit 8 includes equipment for moving the camera support unit 7 in the vertical direction or the horizontal direction. For example, when the camera support unit 7 is a rope, it includes a reel mechanism for raising and lowering the rope. When the camera support unit 7 is a metal rod, it includes a mechanism for moving the metal rod in the vertical direction. The crane unit 8 may include a mechanism for moving the camera support unit 7 horizontally (substantially horizontally) or in a semicircular (elliptical) shape, for example, a mechanism for horizontally moving, rotating, or turning a neck or a foot of the crane unit 8. The horizontal movement and the semicircular movement can be achieved by moving the ship carrying the crane unit 8. The crane unit 8 is controlled by a user, and includes a control lever, a button (not illustrated), and the like. In the case of the small stereo camera, the user may directly operate the small stereo camera by hand instead of the crane unit 8.

The camera position adjustment unit 6 adjusts the posture of the stereo camera 3 in the water, that is, the horizontal angle (left-right direction) and the vertical angle (up-down direction) of the stereo camera 3. The camera position adjustment unit 6 is a mechanism that is attached between the stereo camera 3 and the camera support unit 7 and is capable of rotating in the horizontal direction and rotating in the vertical direction. For example, the camera position adjustment unit 6 may be an electric gear mechanism for adjusting the vertical and horizontal angles, or may be a piano wire attached to the stereo camera 3 for adjusting the horizontal and vertical angles.

The camera position control unit 5 is a mechanism for the user to control the movement of the camera position adjustment unit 6 on the ship. For example, in a case where the camera position adjustment unit 6 is an electric gear mechanism, it is a lever, a button, or the like for adjusting the underwater gear mechanism from on the ship, and in a case where the camera position adjustment unit 6 is a piano wire, it is a reel mechanism, a motor, or the like for adjusting the position of the piano wire attached to the left, right, upper, and lower sides. In addition, the camera position control unit 5 may have a communication function, and the camera position control unit 5 and the terminal 2 may be connected by wired or wireless communication. The camera position control unit 5 may receive a user's instruction from the terminal 2 via the display unit 2a and control the camera position adjustment unit 6.

((Server Device))

Figure 2:
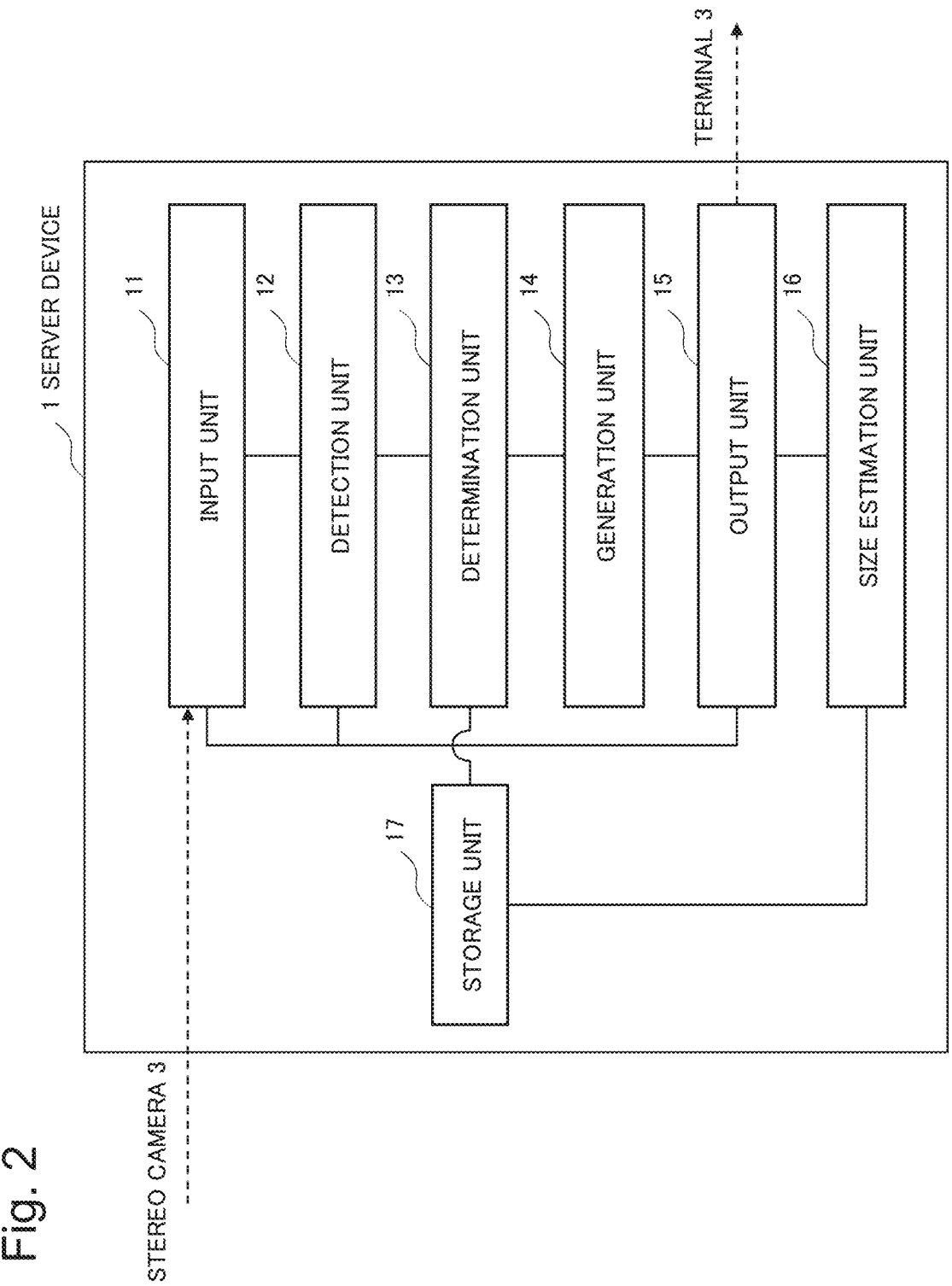
FIG. 2 is a block diagram illustrating a configuration example of a server device.

The server device 1 is installed between the stereo camera 3 and the terminal 2 and is communicably connected to both. As illustrated in FIG. 2, the server device 1 includes an input unit 11, a detection unit 12, a determination unit 13, a generation unit 14, an output unit 15, a size estimation unit 16, and a storage unit 17.

The input unit 11 acquires an underwater image captured by the stereo camera 3. Input unit 11 delivers the acquired image to the detection unit 12. Note that the input unit 11 may deliver the acquired image to the output unit 15, and the output unit 15 may first transmit the image to the terminal 2.

The detection unit 12 detects an underwater organism from an image acquired by the camera. The detection unit 12 uses the learning model created by learning the image of the fish in the water to determine the appearance of the fish in the acquired image. The learning model is a model created by learning an image of the fish imaged under water as teacher data, and can detect a fish appearing in the image. In a case where the fish is detected in the image using the learning model, the detection unit 12 determines, for example, whether equal to or more than a predetermined size and equal to or more than a predetermined number of fish are shown in the image. Specifically, for example, the detection unit 12 determines that the area occupancy ratio in the image of the specific fish is equal to or more than a predetermined value (for example, 20%) and equal to or more than a predetermined number (for example, one fish). Also in a case where a plurality of fish appears in the image, the detection unit 12 similarly determines the appearance of the fish and detects each fish. Here, the state in which a plurality of fish appears also includes a state in which a fish group appears in the image.

Figure 3:
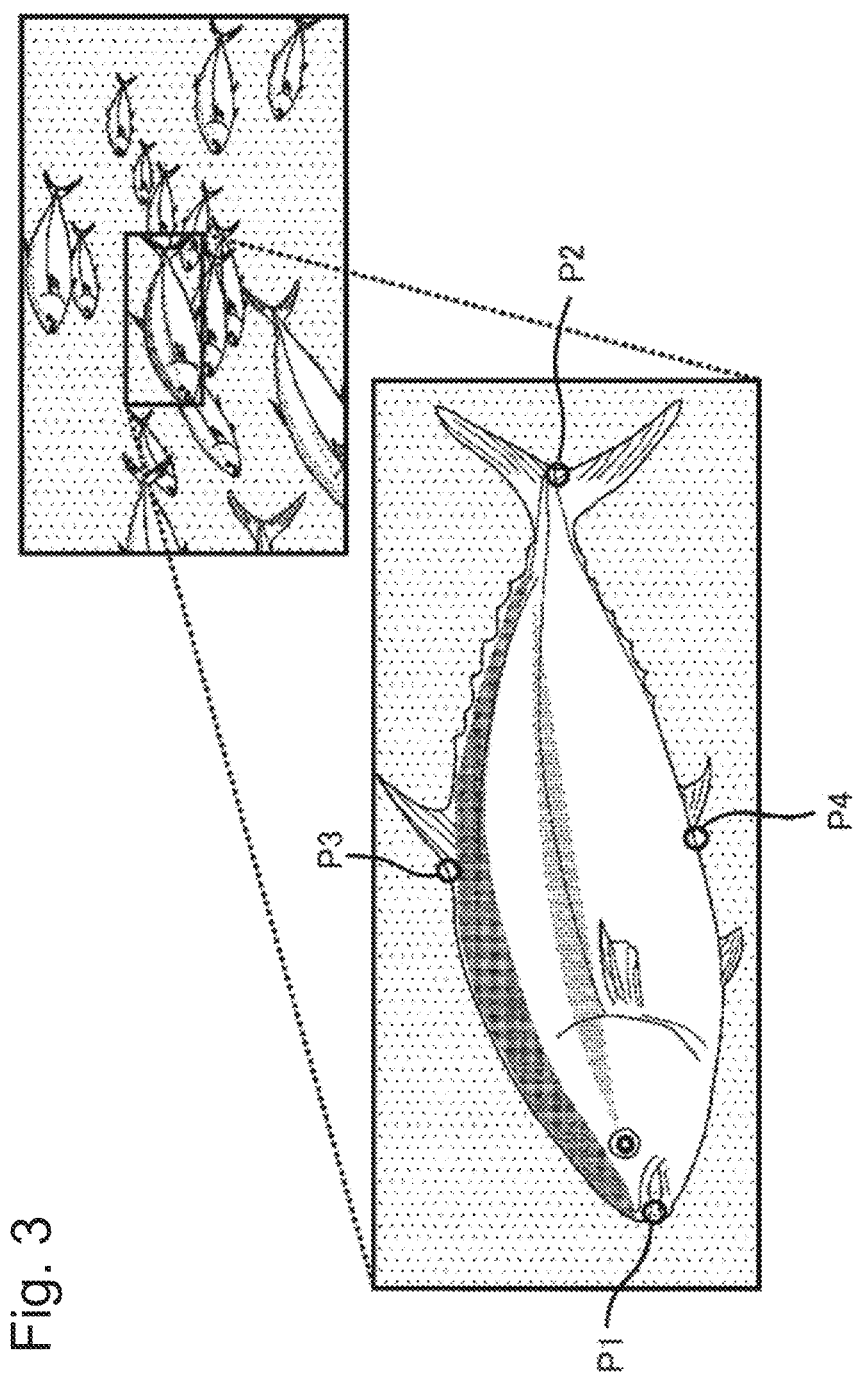
FIG. 3 is a diagram illustrating an example of feature points of underwater organisms.

The detection unit 12 further detects the feature point of the fish appearing in the acquired image by using the learning model created by learning the image of the feature point of the fish. The detection unit 12 detects, as the feature points of the fish, a feature point P1 indicating a mouth tip end position of the fish, and a feature point P2 indicating a caudal fin base position as a feature point related to the feature point P1 as illustrated in FIG. 3, for example. In addition, the detection unit 12 may detect, as the feature points of the fish, a feature point P3 indicating the dorsal fin anterior base position, and a feature point P4 indicating the ventral fin anterior base position as the feature point related to P3. The detection unit 12 reads, for each fish body, the representative coordinates (for example, the center point) of each of the feature points obtained from the image for the left and right lenses, and calculates the three-dimensional coordinates of each feature point in the three-dimensional space. For the calculation, a known technique for conversion into three-dimensional coordinates such as a direct linear transformation (DLT) method is used. In the DLT method, a calibration coefficient representing a relationship between coordinates of a point in a captured image and actual two-dimensional and three-dimensional coordinates is calculated in advance, and three-dimensional spatial coordinates are obtained from the point in the captured image using this coefficient. The detection unit 12 may detect the feature point in a case where it is determined that the fish appears in the acquired image. The above method is an example of detection by the detection unit 12, and the detection unit 12 may use a known method of detecting a feature point of the fish in an image acquired from the stereo camera 3. Furthermore, in a case where a plurality of fish appears in the image, the detection unit 12 may detect a feature point for each detected fish.

When the detection unit 12 detects that the fish appears in the image, the determination unit 13 determines the positional relationship between the fish and the stereo camera 3 using the depth distance, from the stereo camera 3 to the fish, acquired from the stereo camera 3. The positional relationship refers to a direction of the detected fish with respect to the imaging face of the stereo camera 3 and a distance between the fish and the stereo camera 3. Specifically, the determination unit 13 determines whether the side face of the fish (side face of the fish body) and the imaging face of the stereo camera 3 face each other based on the positional relationship. The determination unit 13 may determine that the side face of the fish and the imaging face of the stereo camera 3 are at a position facing each other when the optical axis of the stereo camera 3 and the side face of the fish perpendicularly or substantially perpendicularly intersect each other. The determination unit 13 may determine that the fish and the imaging face of the stereo camera 3 face each other in a case where a difference between distances between respective detected feature points, of the fish, having a related relationship and the stereo camera 3 is within a predetermined range. Specifically, the determination unit 13 calculates the distance between each feature point of the fish detected by the detection unit 12 and the stereo camera 3, and determines whether the difference in distance between the related feature points falls within a predetermined range. For example, the determination unit 13 determines whether the difference between the distance between the feature point P1 indicating the mouth tip end position of the fish and the stereo camera 3 and the distance between the feature point P2 indicating the caudal fin base position and the stereo camera 3 is within a predetermined range.

Furthermore, the determination unit 13 may determine whether the detected fish is within the optimal imaging range. The optimal imaging range is a range suitable for estimating the size of the fish in the imaging range of the stereo camera 3. For example, the determination unit 13 may determine whether the distance between the fish and the stereo camera 3 is within a predetermined range as the determination of whether the detected fish is within the optimal imaging range. Even when this distance is small (the stereo camera 3 and the fish are too close), or even when this distance is large (the stereo camera 3 and the fish are too far), an image suitable for size estimation is not obtained.

Therefore, it is preferable to set in advance a distance (for example, a range from 50 cm to 2 m from the camera) at which an optimal image can be captured. As the determination as to whether the detected fish is within the optimal imaging range, the determination unit 13 may determine whether there is the fish within a predetermined vertical distance range of the stereo camera 3. The vertical distance refers to a distance that the stereo camera 3 has moved in the vertical direction of up or down. Within the predetermined vertical distance range means, for example, a range within 1 m immediately above and 1 m immediately below the camera as a starting point when within a vertical distance of 1 m. This can be performed by the detection unit 12 using a learning model created by learning in association with an image obtained by capturing the fish from the upper face or an image obtained by capturing the fish from the lower face and the vertical distance between the stereo camera 3 and the detected fish in each image. That is, together with the detection unit 12 detecting the fish in the image, the determination unit 13 can determine whether there is the fish within a predetermined vertical distance range of the stereo camera 3.

Note that, in a case where it is determined whether there is the fish within a predetermined vertical distance range of the stereo camera 3, the detection unit 12 may determine whether the elevation angle of the fish position when the optical axis position of the lens is set to 0° is within a threshold value (for example, an elevation angle of 10°). The elevation angle can be measured using a stereo vision function of the stereo camera 3 (a measurement function of restoring a position, a distance, and the like of a three-dimensional object from an image based on triangulation). In this case, after roughly grasping how far the fish detected using the learning model is positioned in the vertical direction from the water surface with respect to the stereo camera 3, an accurate position may be measured using the stereo vision function, and a direction (up or down) and a distance in which the stereo camera 3 should move vertically may be calculated.

When the detection unit 12 detects a plurality of fish (fish group) in the image capturing the fish group, the determination unit 13 determines a positional relationship between each of the plurality of detected fish and the stereo camera 3. The determination unit 13 may determine that the group of fish and the imaging face of the stereo camera 3 face each other in a case where side faces of equal to or more than a predetermined number of fish of the plurality of fish face the imaging face of the stereo camera 3 based on the positional relationship between the plurality of fish and the stereo camera 3. Specifically, the determination unit 13 calculates the distance between each feature point of the fish and the stereo camera 3 for each detected fish, and determines whether the side face of each fish faces the imaging face of the stereo camera 3 based on whether the difference in distance between the related feature points (for example, feature points P1 and P2) falls within a predetermined range. Then, when determining that equal to or more than the predetermined number of fish face each other, the determination unit 13 determines that the group of fish and the stereo camera 3 face each other. Here, the predetermined number may be a predetermined number (for example, equal to or more than five). In a case where the average of the differences obtained for each of the plurality of fish (fish group) falls within a predetermined range, the determination unit 13 may determine that the fish group and the imaging face of the stereo camera 3 face each other. The determination unit 13 may determine that the fish group and the imaging face of the stereo camera 3 face each other in a case where the side faces of equal to or more than a predetermined number of fish in the fish group and the imaging face of the stereo camera 3 face each other based on the positional relationship between the fish group and the stereo camera 3.

The determination unit 13 may determine whether the fish group and the imaging face of the stereo camera 3 face each other based on the average of the respective positional relationships between the plurality of detected fish and the stereo camera 3. Specifically, the determination unit 13 may calculate an average of the plurality of detected fish with respect to the difference in distances of the related feature points of each fish, and determine whether the calculated average falls within a predetermined range, thereby determining whether the fish group faces the imaging face of the stereo camera 3. For example, the determination unit 13 calculates a difference between a distance between the feature point P1 and the stereo camera 3 and a distance between the feature point P2 and the stereo camera 3 of a certain fish for each of the plurality of detected fish, and determines whether an average of the distances falls within a predetermined range.

Furthermore, when determining the positional relationship between the plurality of detected fish and the stereo camera 3, the determination unit 13 may weight information on fish in the optimal imaging range in the area imaged by the stereo camera 3. The positional relationship and the weighting between the plurality of detected fish and the stereo camera 3 may be performed using a vector (space vector or the like) representing the direction in which the fish faces. As the determination of the positional relationship, the direction of the fish (fish group) may be classified into, for example, either left or right.

Until the determination unit 13 determines that the side face of the fish or the fish group and the imaging face of the stereo camera 3 face each other, the detection processing by the detection unit 12, the determination processing by the determination unit 13, and the output processing by the output unit 15 may be repeated.

Figure 4:
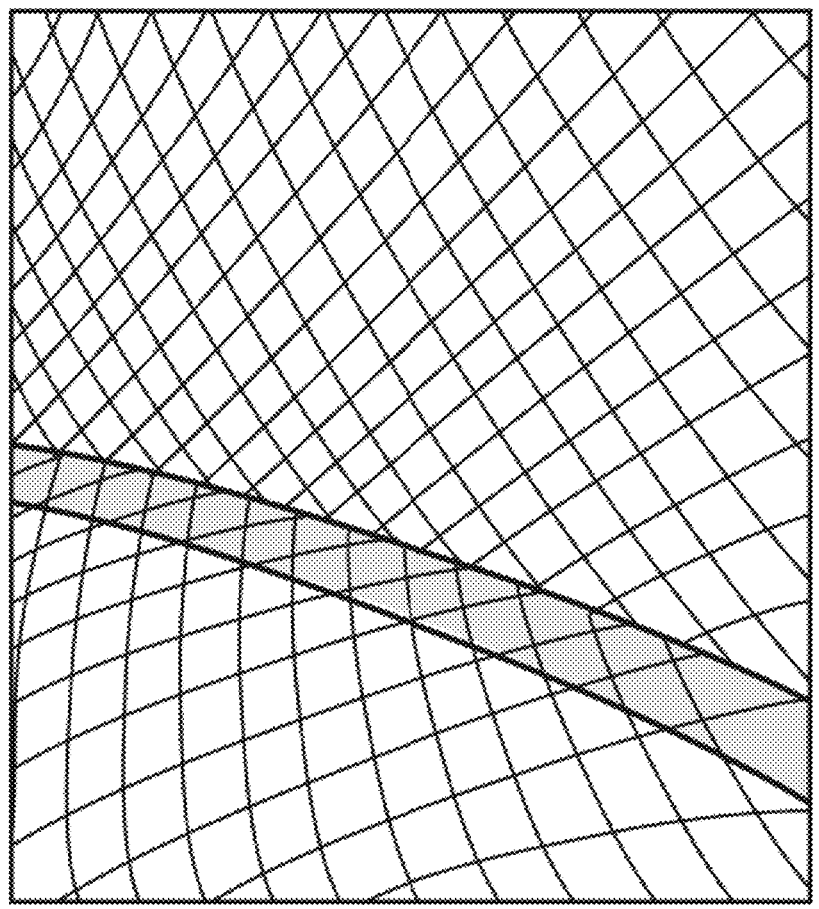
FIG. 4 is a view illustrating a first example of a captured underwater image.

Specific examples will be described below. In the case of the image as illustrated in FIG. 4, since the net in the cage is imaged, the detection unit 12 does not detect the fish to output the detection result to the output unit 15.

Figure 5:
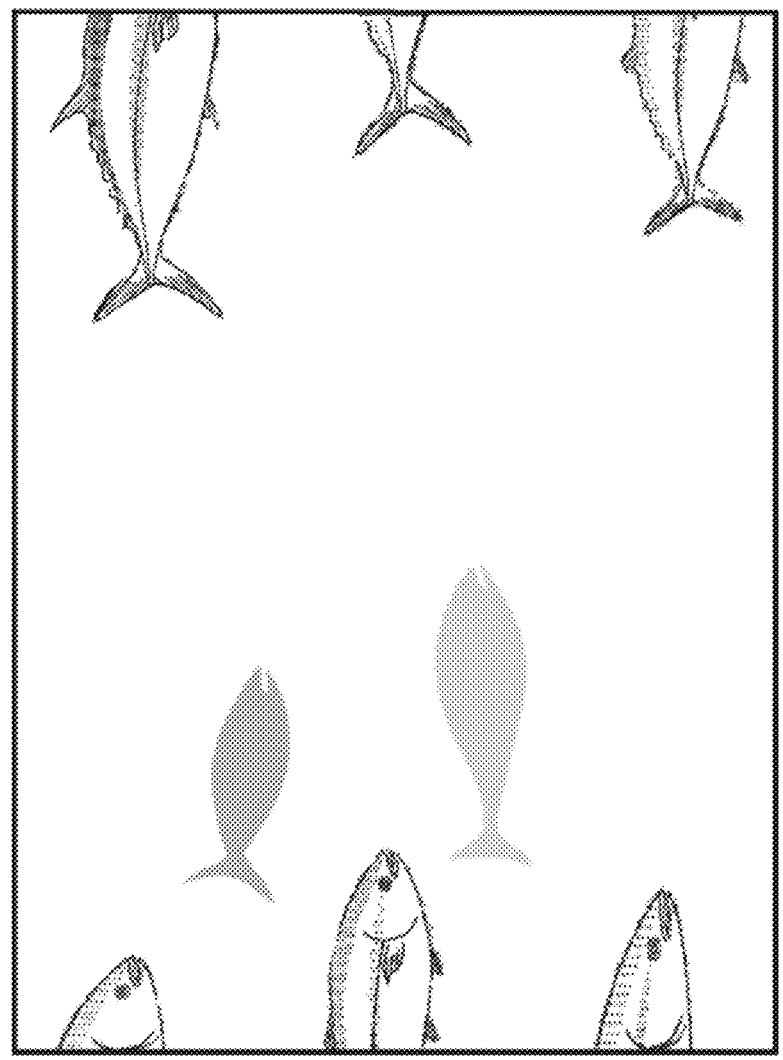
FIG. 5 is a diagram illustrating a second example of a captured underwater image.

In the case of the image as illustrated in FIG. 5, since the fish is imaged, the detection unit 12 detects that the fish is imaged, but since there is a distance from the fish, the fish does not appear well, and the entire fish is not imaged (the image of the fish is cut halfway). Therefore, the detection unit 12 determines that no fish to be imaged appears in the image, to output the determination to the output unit 15 as a detection result.

Figure 6:
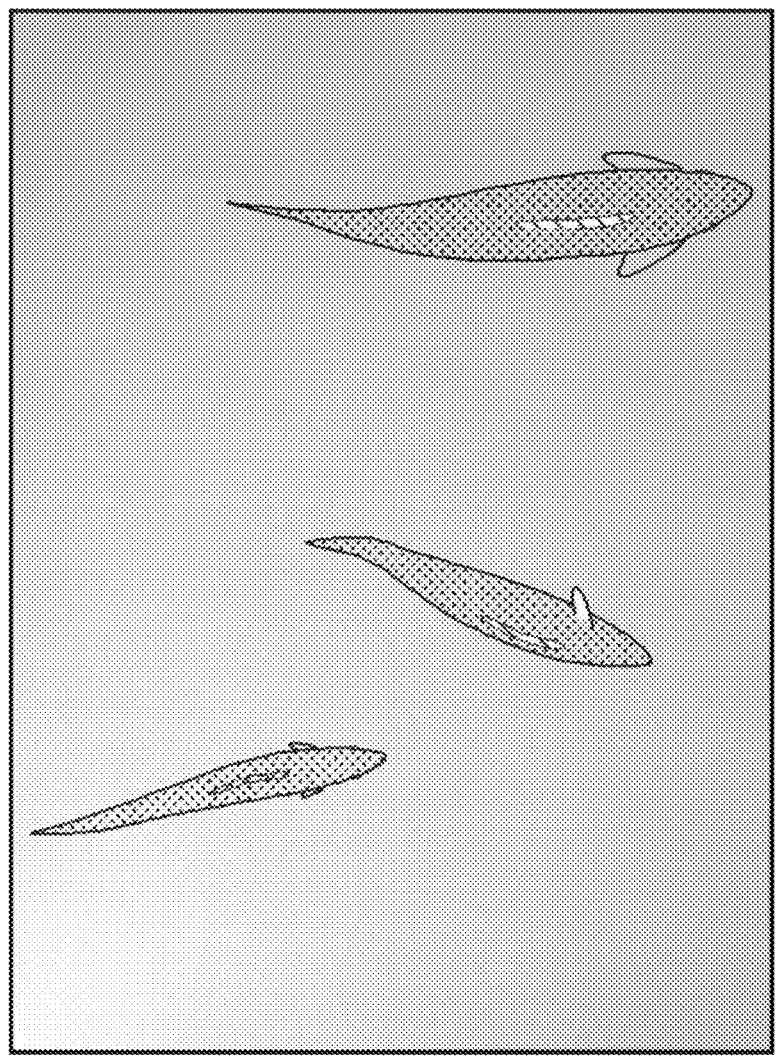
FIG. 6 is a view illustrating a third example of a captured underwater image.

In the case of the image as illustrated in FIG. 5, since the fish is imaged, the detection unit 12 determines that the fish appears in the image. However, FIG. 6 is an image in which the fish is looked down from above, and the position of the fish is at a position lower than that of the stereo camera 3 by equal to or more than a threshold value (about an inclination angle of 60°). Therefore, the detection unit 12 determines that the position of the fish has a distance equal to or more than the threshold value below the stereo camera 3, and the fish to be captured does not appear in the image to output the determination to the output unit as a detection result. At this time, the detection unit 12 may simultaneously output, to the output unit 15, information indicating that the position of the stereo camera 3 should be vertically lowered, how far it is to the position of the fish, that is, how much and in which direction the stereo camera 3 should be moved, as the auxiliary information.

Figure 7:
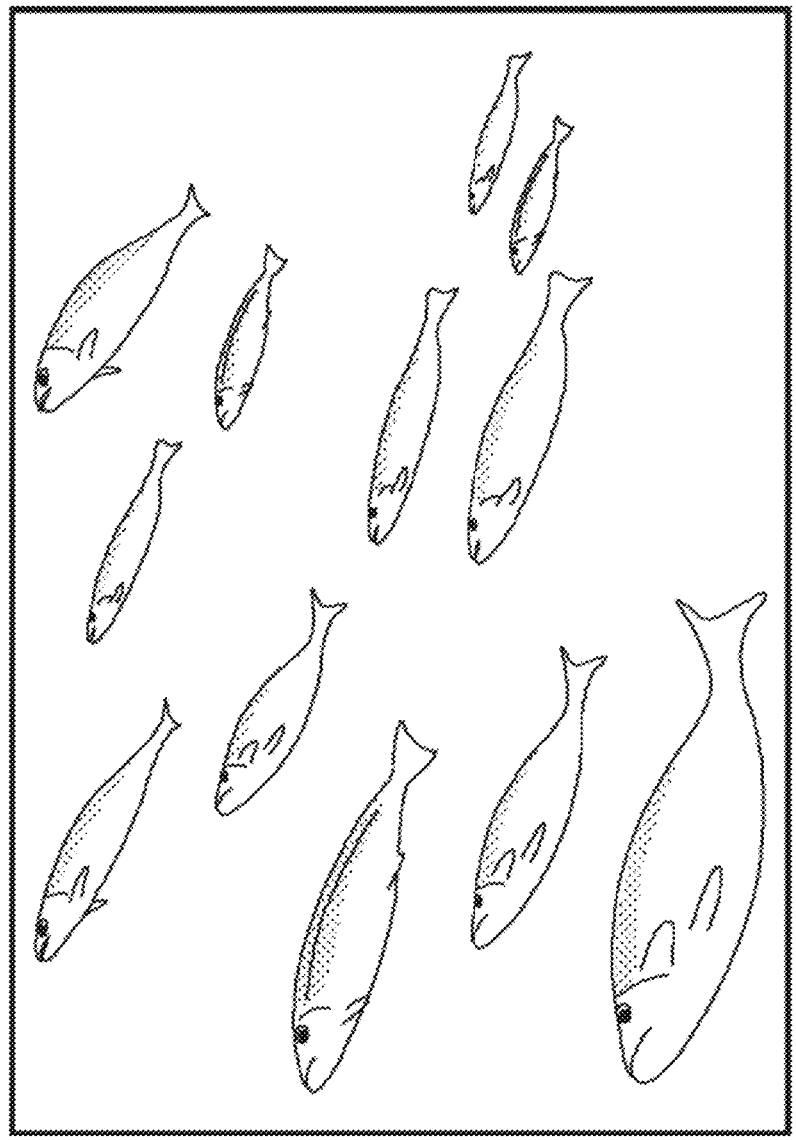
FIG. 7 is a diagram illustrating a fourth example of a captured underwater image.

In the case of the image illustrated in FIG. 7, since the fish is imaged within the predetermined vertical distance range from the position of the stereo camera 3, the detection unit 12 detects that the fish is imaged to output the detection result to the determination unit 13. The determination unit 13 determines the positional relationship between the fish and the stereo camera 3. In the case of the image illustrated in FIG. 7, the image is captured from the ventral side of the fish and is not a facing image of the side face of the fish. Therefore, the determination unit 13 determines that the side face of the fish and the imaging face of the camera does not face each other to output the determination result to the generation unit 14.

Figure 8:
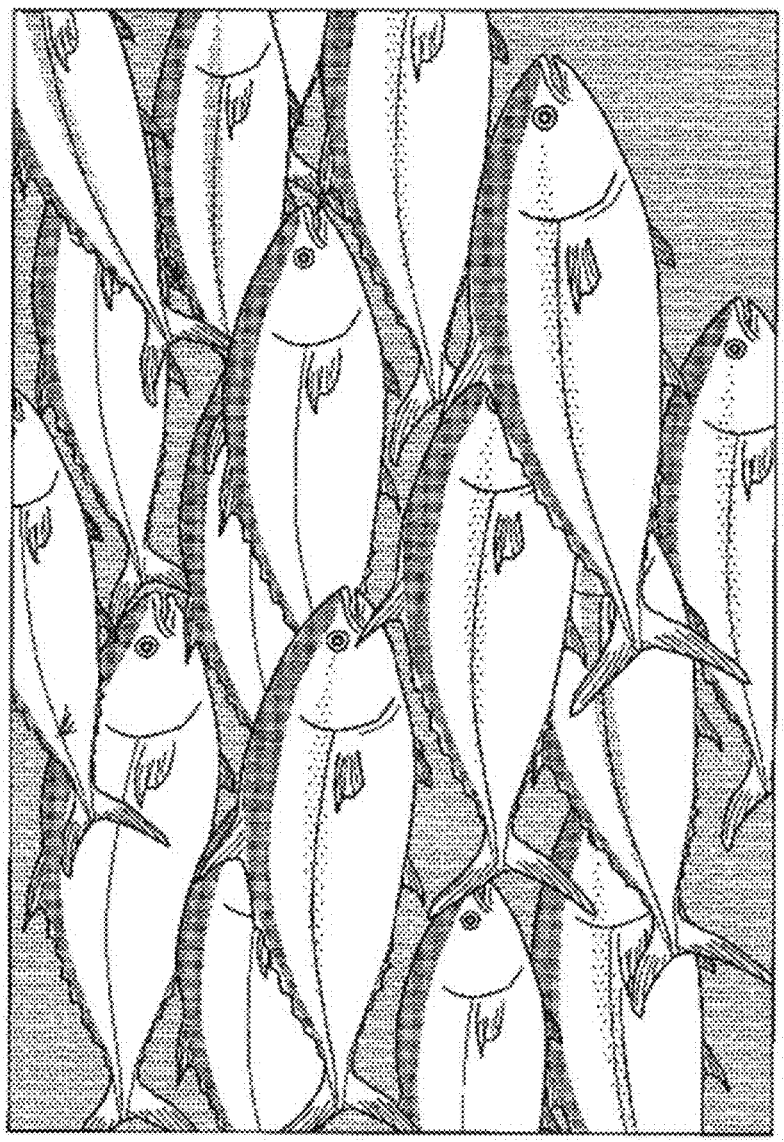
FIG. 8 is a view illustrating a fifth example of a captured underwater image.

The image illustrated in FIG. 8 is captured in which the side face of the fish faces the imaging face of the camera within the optimal imaging range from the position of the stereo camera 3. In this case, the determination unit 13 determines that the image acquired from the stereo camera 3 is an image suitable for size estimation. Then, the determination unit 13 outputs, to the stereo camera 3, a determination result indicating that recording is started, and the stereo camera 3 starts recording and stores an image recorded for a predetermined time in the storage unit 17. Furthermore, the determination unit 13 may output, to the output unit 15, information indicating that recording is started, or may output, to the output unit 15, information indicating that movement of the stereo camera 3 is not necessary. Note that the start of recording may be performed after waiting for an instruction from the user who has received the notification via the output unit 15. Determination as to whether the side face of the fish and the imaging face of the camera face each other and recording may be performed in parallel.

In a case where the determination unit 13 determines that the side face of the fish does not face the imaging face of the camera, the generation unit 14 generates, as the auxiliary information, information for moving the stereo camera 3 to a position where the side face of the fish and the imaging face of the camera face each other. The generation unit 14 may generate auxiliary information for moving the camera based on the direction of the fish (fish group) determined by the determination unit 13. Specifically, the generation unit 14 may generate the auxiliary information for adjusting the position of the stereo camera 3 in the direction in which the fish swims by estimating the direction in which the fish swims from the direction of the fish (fish group).

Figure 9:
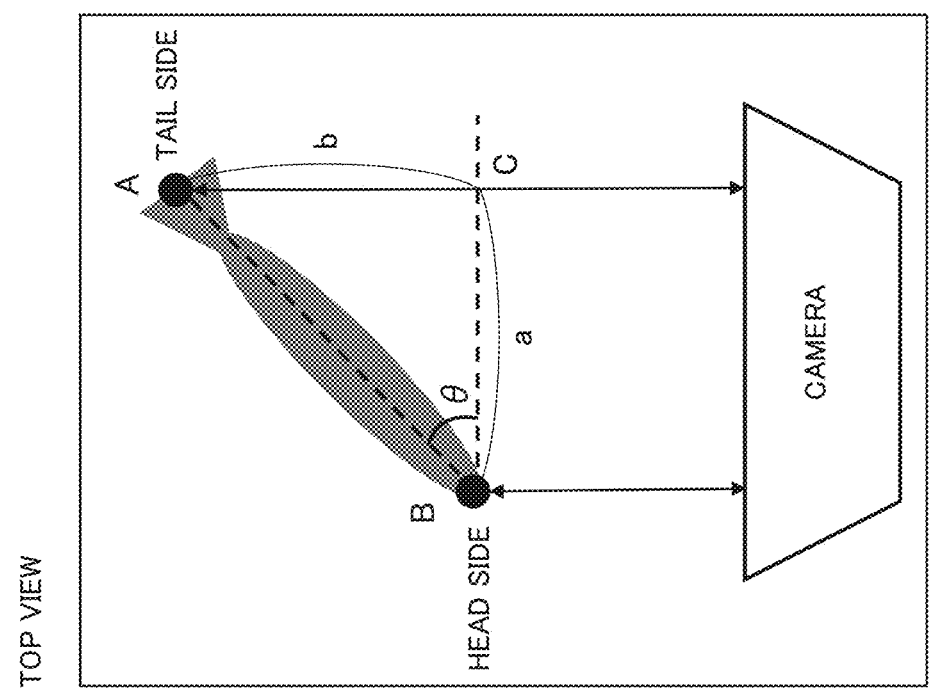
FIG. 9 is a schematic diagram illustrating a positional relationship between an underwater organism and a camera.

Here, a method of determining whether the side face of the fish faces the imaging face of the camera and a method of generating auxiliary information will be described. FIG. 9 is a diagram illustrating a positional relationship between a camera lens surface of the stereo camera 3 and the fish from an upper face for simplicity of description. A fish tail is a point A, and a fish mouth tip is a point B. The distance A from the camera lens surface of the stereo camera 3 to the point A and the distance B from the camera lens surface of the stereo camera 3 to the point B can be measured using a general stereo vision principle. By determining whether the difference between the distance A and the distance B is within a predetermined range, the determination unit 13 determines whether the image is a facing image of the side face of the fish. Note that, in order to capture the facing image of the side face of the fish with the camera, it is necessary to adjust the position of the camera in such a way that the side face of the fish and the imaging face of the camera face each other. More precisely, it is preferable to adjust the position of the camera to a position where the optical axis of the camera and the side face of the fish perpendicularly or substantially perpendicularly intersect each other.

A point at which a straight line passing through the point B and parallel to the camera lens surface of the stereo camera 3 intersects a normal line of the camera lens surface of the stereo camera 3 passing through the point A is defined as C. Note that it is assumed that a plane that passes through the points A and B and is perpendicular to the camera lens surface is parallel to the face displayed in the top view of FIG. 9.

The length a of the line segment connecting the point B and the point C can be measured from the distance B, the angle of view of the stereo camera 3, and the position of the pixel on the screen. The length b of the line segment connecting the point C and the point A is (distance A—distance B). In this case, the generation unit 14 calculates an angle θ formed by a straight line passing through the point A and the point B and the line segment BC from the following equation.

$$\tan^{-1} b/a = \theta \quad \text{(Equation 1)}$$

When the ratio of a to b is 1, θ=45°. Therefore, the generation unit 14 determines that the camera lens surface of the stereo camera 3 should be rotated counterclockwise by 45° in such a way that the side face of the fish faces the imaging face of the camera. Therefore, the generation unit 14 generates, as the auxiliary information, a sign (an arrow or the like) or a sentence for instructing to rotate the angle of the stereo camera 3 counterclockwise by 45°.

Since most of the fish have a habit of swimming with the dorsal fin facing upward and the ventral fin facing downward, the side face of the fish can be calculated by using the fish tail (point A) and the fish mouth tip (point B). However, in a case where it is necessary to consider the inclination between the fish body and the lens surface of the camera due to the influence of the sea current or the like, it is possible to more accurately determine the side face by calculating the angle using the above equation 1 with respect to the distance C between the point of the dorsal fin of the fish and the camera and the distance D between the point of the ventral fin and the camera. In addition, in a case where it is not desired to apply a load to the determination unit 13, the detection unit 12 can also detect the fish in a state of facing the imaging face of the camera by using a learning model created by learning a facing image of a side face of the fish. As a result, it is possible to perform setting in such a way that the detection unit 12 does not transmit the image of the fish extremely inclined toward the stereo camera 3 to the determination unit 13.

Figure 10:
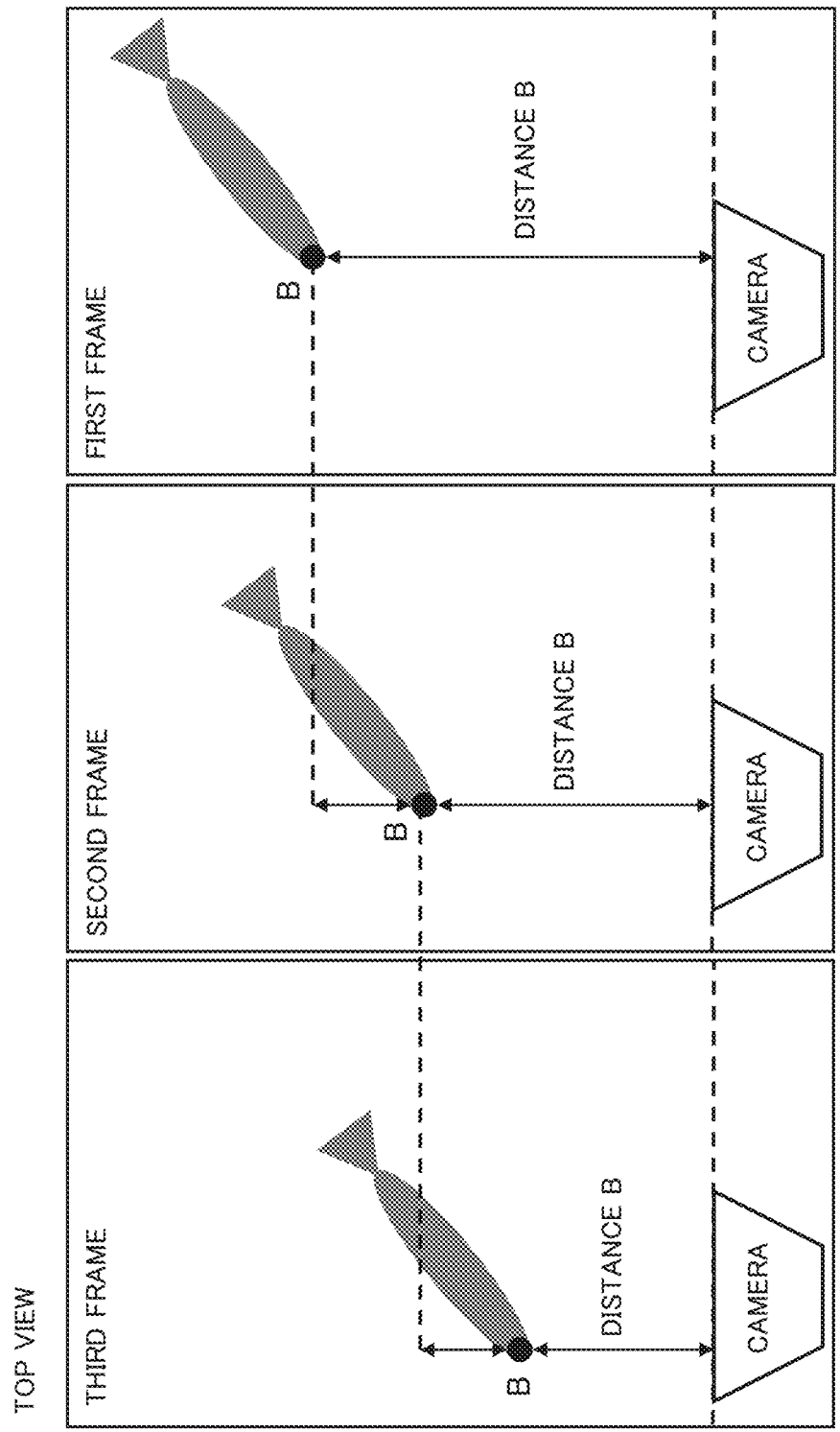
FIG. 10 is a schematic diagram illustrating a time-series positional relationship between an underwater organism and a camera.

The determination unit 13 may determine the traveling direction of a fish using a plurality of images obtained by imaging the same fish. For example, the stereo camera 3 captures the image illustrated in FIG. 9 a plurality of times at predetermined intervals, for example, at 12 frames per second. FIG. 10 illustrates three consecutive frames. As can be seen from FIG. 10, the distance B between the point B indicating the mouth tip and the lens surface of the stereo camera 3 decreases from the first frame on the right side to the third frame. In this case, the determination unit 13 determines that the traveling direction of the fish is the depth direction toward the camera, that is, the fish swims toward the camera. Conversely, when the distance B between the point B indicating the mouth tip and the lens surface of the stereo camera 3 is increased, the determination unit 13 determines that the fish swims in the depth direction away from the camera, that is, in the direction away from the camera. In the case of an image of a group of fish, the determination unit 13 may repeat the above processing by the number of fish appearing in the image, and determine the direction in which the largest number of fish face or the average of the directions of a plurality of fish as the traveling direction of the group. The determination unit 13 may exclude (delete) the image of the fish body on which the direction detection processing has already been completed from the target of the direction detection processing by using a plurality of images obtained by imaging the same fish group.

The generation unit 14 transmits the generated auxiliary information to the output unit 15. The auxiliary information may include the traveling direction of the fish or the fish group described above.

The output unit 15 outputs auxiliary information for moving the stereo camera 3 in such a way that the side face of the fish and the imaging face of the stereo camera 3 face each other based on the positional relationship between the fish and the stereo camera 3. The output unit 15 receives the detection result, the determination result, and the auxiliary information from the detection unit 12, the determination unit 13, and the generation unit 14 to transmit them to the terminal 2 via wired or wireless communication. Note that the output unit 15 also transmits the underwater image received from the stereo camera 3 to the terminal 2 together with the above-described detection result, determination result, and auxiliary information. At this time, the output unit 15 may transmit the image and the detection result, the determination result, and the auxiliary information in a superimposed manner.

The size estimation unit 16 estimates the size of the fish in the cage based on the facing image of the fish stored in the storage unit 17. The size estimation unit 16 calculates information indicating the size of the fish based on the feature point of the fish in the image detected by the detection unit 12. The information indicating the size is, for example, a fork length, a body length, a body height, and a weight. The size estimation unit 16 calculates a fork length based on three-dimensional coordinates of the feature point P1 indicating a mouth tip end position of the fish and the feature point P2 indicating a caudal fin base position, and a body height based on three-dimensional coordinates of the feature point P3 indicating a dorsal fin anterior base position and the feature point P4 indicating a ventral fin anterior base position. Furthermore, the size estimation unit 16 inputs the calculated fork length and body height as variables to a weight calculation formula for calculating the weight of the fish, and calculates the weight.

((Terminal))

The terminal 2 is a portable communication terminal carried by a user who captures an image of the fish. Although a tablet terminal type is illustrated in FIG. 1, a wearable headset including a head mounted display device or a speaker as an output means and a microphone or the like as an input device may be used.

Figure 11:
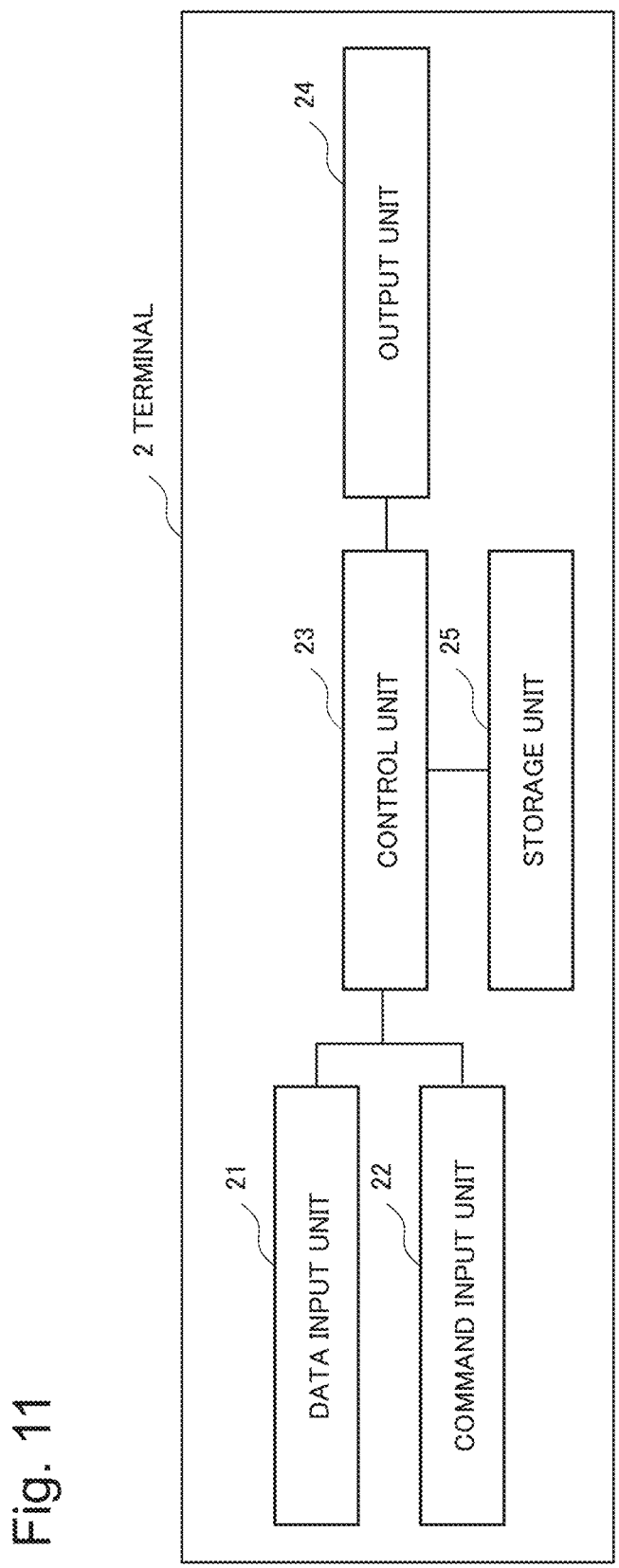
FIG. 11 is a block diagram illustrating a configuration example of a terminal.

As illustrated in FIG. 11, the terminal 2 includes a data input unit 21, a command input unit 22, a control unit 23, an output unit 24, and a storage unit 25. The data input unit 21 receives an image, a notification, and auxiliary information from the server device 1. The control unit 23 controls data input/output processing of the terminal. The output unit 24 is a display device for outputting an image, a notification, and auxiliary information. The command input unit 22 receives a next instruction from the user via an icon or the like displayed on the output unit 24. The storage unit 25 is a memory for temporarily storing the image, the notification, and the auxiliary information received from the server device 1.

When the data input unit 21 receives the image, the notification, and the auxiliary information from the server device 1, the control unit 23 outputs them to the output unit 24. The user adjusts the position of the stereo camera 3 under water via the crane unit 8 and the camera position control unit 5 illustrated in FIG. 1 based on the output image, notification, and auxiliary information.

(Operation of Underwater Organism Imaging System)

Figure 12:
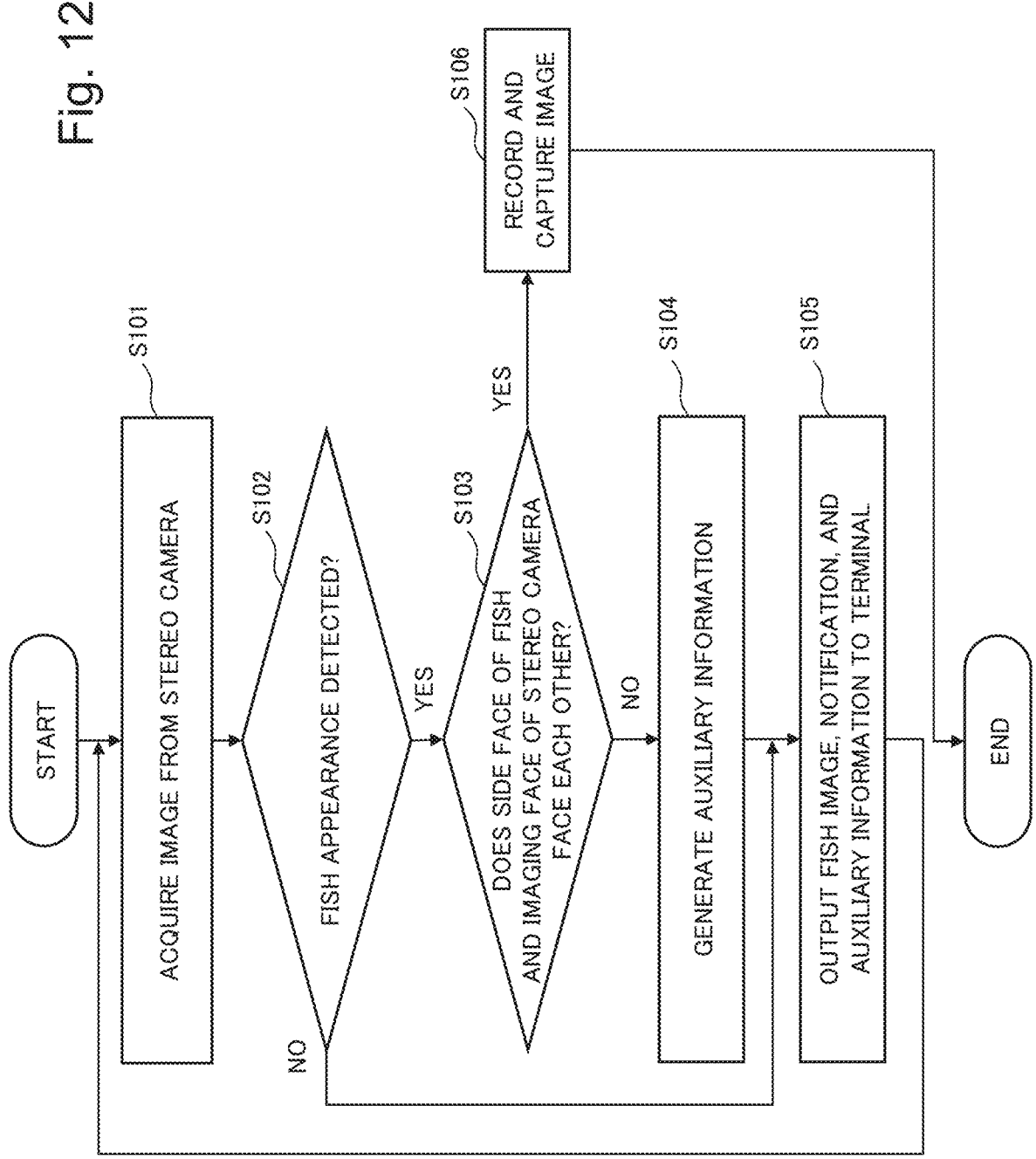
FIG. 12 is a flowchart illustrating an operation of the underwater organism imaging system according to the first example embodiment of the present disclosure.

An operation of the underwater organism imaging system 100 will be described with reference to a flowchart illustrated in FIG. 12. In the following description, as illustrated in FIG. 1, it is assumed that the user's ship is on the water surface in the cage, the stereo camera 3 is suspended from the crane unit 8 after being attached to the camera support unit 7 and exists in the water, and is set to be adjustable by the camera position adjustment unit 6.

First, in step S101, the input unit 11 of the server device 1 acquires an image captured by the stereo camera 3 under water. The acquired image is transmitted to the detection unit 12.

In step S102, the appearance of the fish in the image acquired by the detection unit 12 is detected. In a case where the appearance of the fish cannot be detected, the detection unit 12 notifies the output unit 15 of the detection result, and the process proceeds to step S105. In a case where the appearance of the fish is detected, the process proceeds to step S103.

In step S103, the determination unit 13 determines the positional relationship between the stereo camera 3 and the fish. Specifically, the determination unit 13 determines whether the side face of the fish and the imaging face of the stereo camera 3 face each other. As a result of the determination, in a case where the side face of the fish and the imaging face of the stereo camera 3 face each other, the determination unit 13 determines that the image acquired from the stereo camera 3 is an image suitable for size estimation (step S106). In a case where the side face of the fish and the imaging face of the stereo camera 3 does not face each other, the generation unit 14 generates auxiliary information (step S104) to output the auxiliary information to the output unit 15 (step S105).

In step S104, the generation unit 14 generates the auxiliary information for making the side face of the fish face the imaging face of the stereo camera 3.

Figure 13:
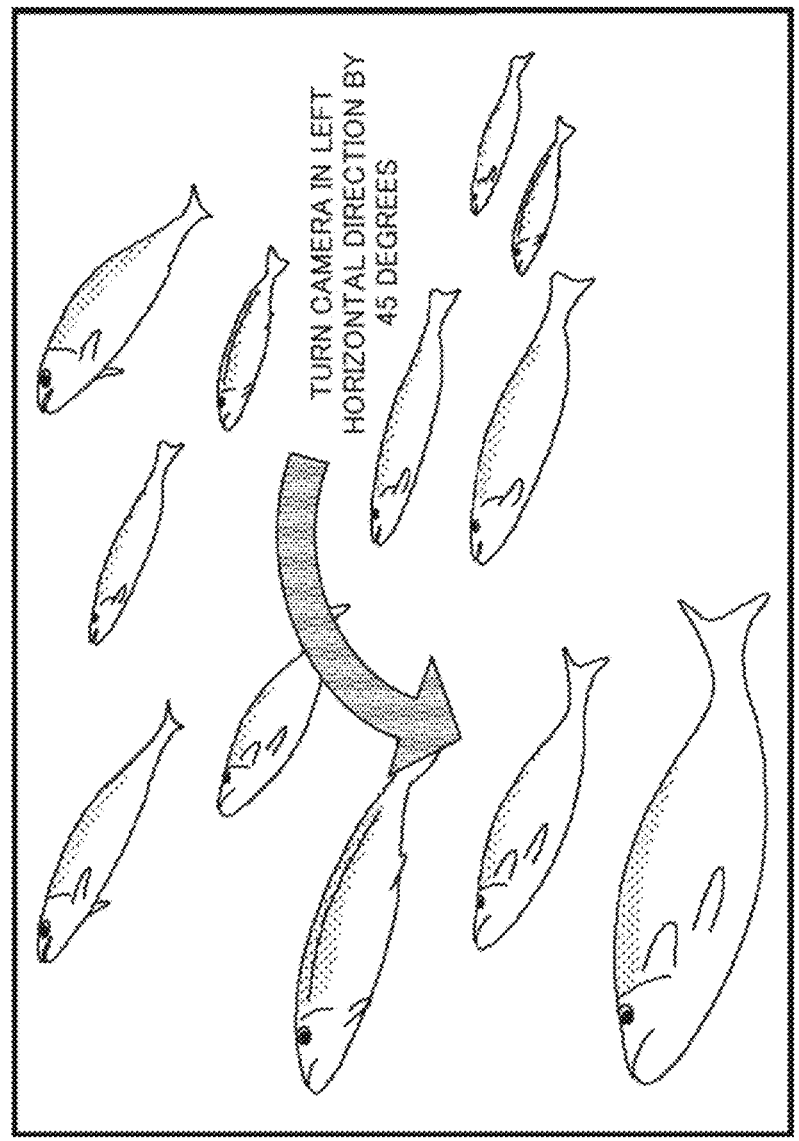
FIG. 13 is a diagram illustrating an example of auxiliary information displayed on an underwater image.

In step S105, the output unit 15 outputs the fish image, the auxiliary information, the above-described detection result, and the determination result (notification) to the terminal 2. When receiving the auxiliary information from the determination unit 13, the output unit 15 outputs, to the terminal 2, the auxiliary information stating that "TURN CAMERA IN LEFT HORIZONTAL DIRECTION BY 45 DEGREES" for moving the stereo camera 3 to a position where the side face of the fish illustrated in FIG. 13 and the imaging face of the stereo camera 3 face each other, for example. The auxiliary information is preferably easy for the user to understand. Therefore, the output unit 15 may convert the direction in which the stereo camera 3 is to be moved and the angle at which the stereo camera 3 is to be moved into the operation of the camera position adjustment unit 6 to output the operation to the terminal 2, thereby causing the display unit 2a to display the auxiliary information. For example, in a case where the camera position adjustment unit 6 is a handle, a message "TURN HANDLE TO THE LEFT BY 15 DEGREES" is presented on the display unit 2a. In a case where it is not possible to detect the appearance of the fish of equal to or more than a predetermined size and equal to or more than a predetermined number in the image even though the user has performed the correction operation of the stereo camera 3 a predetermined number of times, it is estimated that the fish are not present near the current position of the ship. In this case, the output unit 15 may make a presentation to suggest the movement of the ship to the display unit 2a.

Thereafter, in a case where the user browses the notification or the auxiliary information presented on the display unit 2a of the terminal 2 and operates the adjustment unit 4 to adjust the position of the stereo camera 3, the processes of steps S101 to S105 is executed again until the facing image of the side face of the fish is captured. The re-execution timing may be automatically performed when the detection unit 12 detects the difference between the images captured by the stereo camera 3, or may be performed after the user requests the image capturing assistance again via the terminal 2 and the server device 1 receives the image capturing assistance.

Note that the recorded video of the image of the side face is stored in the storage unit 17, and the size estimation unit 16 estimates the size of the fish in the cage based on the video or image of the fish stored in the storage unit 17.

This is the end of the description of the operation of the underwater organism imaging system 100.

Effects of First Example Embodiment

According to the present example embodiment, it is possible to capture a fish image suitable for estimation when estimating the size of an underwater organism. This is because the determination unit 13 determines whether the side face of the fish detected by the detection unit 12 and the imaging face of the stereo camera 3 are in a positional relationship of facing each other, and the output unit 15 outputs auxiliary information for moving the stereo camera 3 to the user until the above-described positional relationship is established.

Second Example Embodiment

Figure 14:
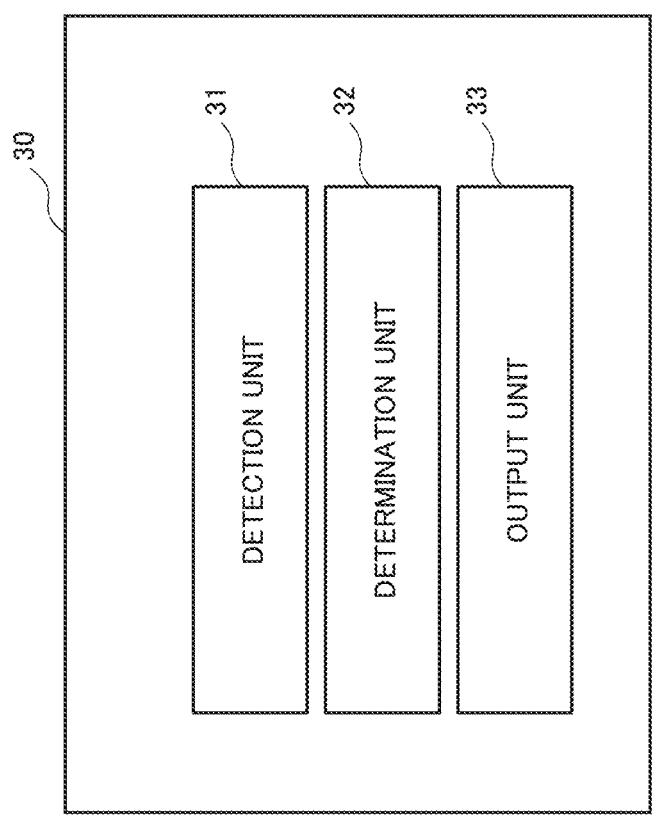
FIG. 14 is a block diagram illustrating a configuration example of an underwater organism imaging aid device according to a second example embodiment of the present disclosure.

As illustrated in FIG. 14, an underwater organism imaging aid device 30 according to the second example embodiment of the present disclosure includes a detection unit 31, a determination unit 32, and an output unit 33. The underwater organism imaging aid device 30 is a minimum configuration example of the server device 1 in the first example embodiment.

The detection unit 31 detects an underwater organism from an image acquired by a camera. The determination unit 32 determines a positional relationship between the underwater organism detected by the detection unit 31 and the camera. The output unit 33 outputs auxiliary information for moving the camera in such a way that the side face of the underwater organism and the imaging face of the camera face each other based on the positional relationship.

According to the second example embodiment of the present disclosure, it is possible to capture a fish image suitable for estimation when estimating the size of an underwater organism. This is because the determination unit 32 determines the positional relationship between the underwater organism detected by the detection unit 31 and the camera, and the output unit 33 outputs auxiliary information for moving the camera in such a way that the side face of the underwater organism and the imaging face of the camera face each other based on the positional relationship.

(Information Processing Apparatus)

Figure 15:
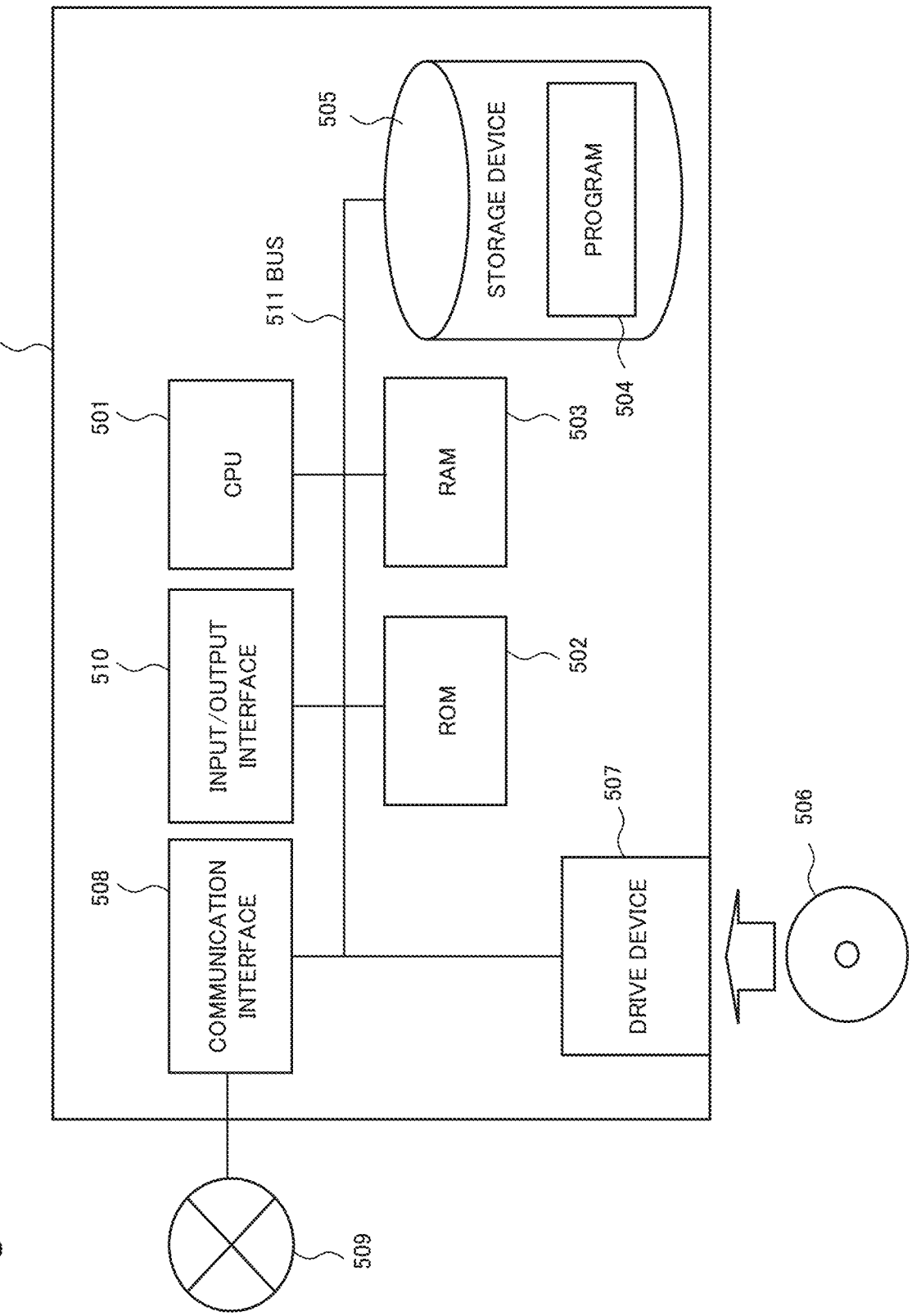
FIG. 15 is a block diagram illustrating a configuration example of an information processing apparatus applicable in each example embodiment.

In each of the above-described example embodiments of the present invention, some or all of the respective components of the server device, the portable communication terminal, and the underwater organism imaging aid device (hereinafter, it is described as an underwater organism imaging aid device and the like) illustrated in FIGS. 2, 11, 14, and the like can be achieved by using, for example, any combinations of an information processing apparatus 500 and the program illustrated in FIG. 15. The information processing apparatus 500 includes the following configuration as an example.

- A CPU 501
- A ROM 502
- A RAM 503
- A storage device 505 storing a program 504 and another data
- A drive device 507 that reads and writes a storage medium 506
- A communication interface 508 connected with a communication network 509
- An input/output interface 510 for inputting/outputting data
- A bus 511 connecting each component Each component such as the underwater organism imaging aid device in each example embodiment of the present application is achieved by the CPU 501 acquiring and executing the program 504 for implementing these functions. The program 504 for implementing the function of each component such as the underwater organism imaging aid device is stored in the storage device 505 or the RAM 503 in advance, for example, and is read by the CPU 501 as necessary. The program 504 may be supplied to the CPU 501 via the communication network 509, or may be stored in advance in the storage medium 506, and the drive device 507 may read the program and supply the program to the CPU 501.

There are various modifications of the implementation method of each device. For example, the underwater organism imaging aid device or the like may be achieved by any combinations of an information processing apparatus and a program that are separate for each component. A plurality of components included in the underwater organism imaging aid device or the like may be achieved by any combinations of one information processing apparatus 500 and a program.

Some or all of the respective components of the underwater organism imaging aid device and the like are achieved by another general-purpose or dedicated circuit, a processor and the like, or a combination thereof. These may be configured by a single chip or may be configured by a plurality of chips connected via a bus.

Some or all of the respective components of the underwater organism imaging aid device and the like may be achieved by a combination of the above-described circuit and the like and the program.

In a case where some or all of the respective components of the underwater organism imaging aid device and the like are achieved by a plurality of information processing apparatuses, circuits, and the like, the plurality of information processing apparatuses, circuits, and the like may be disposed in a centralized manner or in a distributed manner. For example, the information processing apparatus, the circuit, and the like may be achieved as a form in which each of the information processing apparatus, the circuit, and the like is connected via a communication network, such as a client and server device system, a cloud computing system, and the like.

Some or all of the above example embodiments may be described as the following Supplementary Notes, but are not limited to the following.

[Supplementary Note 1]

An underwater organism imaging aid device including a detection means configured to detect an underwater organism from an image acquired by a camera, a determination means configured to determine a positional relationship between the underwater organism detected by the detection means and the camera, and an output means configured to output auxiliary information for moving the camera in such a way that a side face of the underwater organism and an imaging face of the camera face each other based on the positional relationship.

[Supplementary Note 2]

The underwater organism imaging aid device according to Supplementary Note 1, in which the determination means determines that the underwater organism and the imaging face of the camera face each other when a difference between distances between respective detected feature points, of the underwater organism, having a related relationship and the camera is within a predetermined range.

[Supplementary Note 3]

The underwater organism imaging aid device according to Supplementary Note 1 or Supplementary Note 2, in which when the detection means detects a plurality of the underwater organisms, the determination means determines the positional relationship between the plurality of detected underwater organisms and the camera.

[Supplementary Note 4]

The underwater organism imaging aid device according to any one of Supplementary Notes 1 to 3, in which the determination means determines whether the plurality of underwater organisms and the imaging face of the camera face each other based on an average of respective positional relationships between the plurality of underwater organisms and the camera.

[Supplementary Note 5]

The underwater organism imaging aid device according to Supplementary Note 2, in which the determination means determines that the plurality of underwater organisms and the imaging face of the camera face each other when an average of the differences obtained for each of the plurality of underwater organisms is within a predetermined range.

[Supplementary Note 6]

The underwater organism imaging aid device according to any one of Supplementary Notes 1 to 3, in which the determination means determines that the plurality of underwater organisms and the imaging face of the camera face each other when side faces of equal to or more than a predetermined number of underwater organisms among the plurality of underwater organisms and the imaging face of the camera face each other based on respective positional relationships between the plurality of underwater organisms and the camera.

[Supplementary Note 7]

The underwater organism imaging aid device according to any one of Supplementary Notes 1 to 6, in which when determining the positional relationship, the determination means weights information on the underwater organism detected in a predetermined region in an area imaged by the camera.

[Supplementary Note 8]

The underwater organism imaging aid device according to any one of Supplementary Notes 1 to 7, in which the determination means uses a plurality of images including the same underwater organism in the determination.

[Supplementary Note 9]

The underwater organism imaging aid device according to any one of Supplementary Notes 1 to 8, in which the determination means determines that a side face of the underwater organism and an imaging face of the camera are at a position where the side face of the underwater organism and the imaging face of the camera face each other when an optical axis of the camera and the side face of the underwater organism perpendicularly or substantially perpendicularly intersect each other.

[Supplementary Note 10]

The underwater organism imaging aid device according to Supplementary Note 1, in which the underwater organism imaging aid device repeats detection by the detection means, determination by the determination means, and output by the output means until the determination means determines that a side face of the underwater organism or side faces of the plurality of underwater organisms and an imaging face of the camera face each other.

[Supplementary Note 11]

The underwater organism imaging aid device according to Supplementary Note 1, in which the auxiliary information includes an instruction that a controller of the camera moves the camera to a position where a side face of the underwater organism and the camera face each other.

[Supplementary Note 12]

An underwater organism imaging aid system including an underwater organism imaging aid device according to any one of Supplementary Notes 1 to 11, a camera configured to capture an underwater image, and a display device configured to display auxiliary information for imaging a side face of an underwater organism, the auxiliary information being configured to be output by the underwater organism imaging aid device.

[Supplementary Note 13]

The underwater organism imaging aid system according to Supplementary Note 12, further including a camera adjustment device configured to adjust the camera based on the auxiliary information.

[Supplementary Note 14]

An underwater organism imaging aid method including detecting an underwater organism from an image acquired by a camera, determining a positional relationship between the detected underwater organism and the camera, and outputting auxiliary information for moving the camera in such a way that a side face of the underwater organism and an imaging face of the camera face each other based on the positional relationship.

[Supplementary Note 15]

The underwater organism imaging aid method according to Supplementary Note 14, in which the determining includes determining that the underwater organism and the imaging face of the camera face each other when a difference between distances between respective detected feature points, of the underwater organism, having a related relationship and the camera is within a predetermined range.

[Supplementary Note 16]

The underwater organism imaging aid method according to Supplementary Note 14 or Supplementary Note 15, in which when a plurality of the underwater organisms is detected, the determining includes determining the positional relationship between the plurality of detected underwater organisms and the camera.

[Supplementary Note 17]

The underwater organism imaging aid method according to any one of Supplementary Notes 14 to 16, in which the determining includes determining whether the plurality of underwater organisms and the imaging face of the camera face each other based on an average of respective positional relationships between the plurality of underwater organisms and the camera.

[Supplementary Note 18]

The underwater organism imaging aid method according to Supplementary Note 15, in which the determining includes determining that the plurality of underwater organisms and the imaging face of the camera face each other when an average of the differences obtained for each of the plurality of underwater organisms is within a predetermined range.

[Supplementary Note 19]

The underwater organism imaging aid method according to any one of Supplementary Notes 14 to 16, in which the determining includes determining that the plurality of underwater organisms and the imaging face of the camera face each other when side faces of equal to or more than a predetermined number of underwater organisms among the plurality of underwater organisms and the imaging face of the camera face each other based on respective positional relationships between the plurality of underwater organisms and the camera.

[Supplementary Note 20]

The underwater organism imaging aid method according to any one of Supplementary Notes 14 to 19, in which when determining the positional relationship, the determining includes weighting information on the underwater organism detected in a predetermined region in an area imaged by the camera.

[Supplementary Note 21]

The underwater organism imaging aid method according to any one of Supplementary Notes 14 to 20, in which the determining includes using a plurality of images including the same underwater organism in the determination.

[Supplementary Note 22]

The underwater organism imaging aid method according to any one of Supplementary Notes 14 to 21, in which the determining includes determining that a side face of the underwater organism and an imaging face of the camera are at a position where the side face of the underwater organism and the imaging face of the camera face each other when an optical axis of the camera and the side face of the underwater organism perpendicularly or substantially perpendicularly intersect each other.

[Supplementary Note 23]

The underwater organism imaging aid method according to Supplementary Note 14, in which the determining includes repeating the detection, the determination, and the output until it is determined that a side face of the underwater organism or side faces of the plurality of underwater organisms and an imaging face of the camera face each other.

[Supplementary Note 24]

The underwater organism imaging aid method according to Supplementary Note 14, in which the auxiliary information includes an instruction that a controller of the camera moves the camera to a position where a side face of the underwater organism and the camera face each other.

[Supplementary Note 25]

A storage medium storing an underwater organism imaging aid program for causing a computer to execute detecting an underwater organism from an image acquired by a camera, determining a positional relationship between the detected underwater organism and the camera, and outputting auxiliary information for moving the camera in such a way that a side face of the underwater organism and an imaging face of the camera face each other based on the positional relationship.

[Supplementary Note 26]

The storage medium according to Supplementary Note 25, in which the determining includes determining that the underwater organism and the imaging face of the camera face each other when a difference between distances between respective detected feature points, of the underwater organism, having a related relationship and the camera is within a predetermined range.

[Supplementary Note 27]

The storage medium according to Supplementary Note 25 or Supplementary Note 26, in which when detecting a plurality of the underwater organisms, the determining includes determining the positional relationship between the plurality of detected underwater organisms and the camera.

[Supplementary Note 28]

The storage medium according to any one of Supplementary Notes 25 to 27, in which the determining includes determining whether the plurality of underwater organisms and the imaging face of the camera face each other based on an average of respective positional relationships between the plurality of underwater organisms and the camera.

[Supplementary Note 29]

The storage medium according to Supplementary Note 26, in which the determining includes determining that the plurality of underwater organisms and the imaging face of the camera face each other when an average of the differences obtained for each of the plurality of underwater organisms is within a predetermined range.

[Supplementary Note 30]

The storage medium according to any one of Supplementary Notes 25 to 27, in which the determining includes determining that the plurality of underwater organisms and the imaging face of the camera face each other when side faces of equal to or more than a predetermined number of underwater organisms among the plurality of underwater organisms and the imaging face of the camera face each other based on respective positional relationships between the plurality of underwater organisms and the camera.

[Supplementary Note 31]

The storage medium according to any one of Supplementary Notes 25 to 30, in which when determining the positional relationship, the determining includes weighting information on the underwater organism detected in a predetermined region in an area imaged by the camera.

[Supplementary Note 32]

The storage medium according to any one of Supplementary Notes 25 to 31, in which the determining includes using a plurality of images including the same underwater organism in the determination.

[Supplementary Note 33]

The storage medium according to any one of Supplementary Notes 25 to 32, in which the determining includes determining that a side face of the underwater organism and an imaging face of the camera are at a position where the side face of the underwater organism and the imaging face of the camera face each other when an optical axis of the camera and the side face of the underwater organism perpendicularly or substantially perpendicularly intersect each other.

[Supplementary Note 34]

The storage medium according to Supplementary Note 25, in which the determining includes repeating the detection, the determination, and the output until it is determined that a side face of the underwater organism or side faces of the plurality of underwater organisms and an imaging face of the camera face each other.

[Supplementary Note 35]

The storage medium according to Supplementary Note 25, in which the auxiliary information includes an instruction that a controller of the camera moves the camera to a position where a side face of the underwater organism and the camera face each other.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST 1 server device
2 terminal
2a display unit
3 stereo camera
4 adjustment unit
5 camera position control unit
6 camera position adjustment unit
7 camera support unit
8 crane unit
11 input unit
12 detection unit
13 determination unit
14 generation unit
15 output unit
16 size estimation unit
17 storage unit
21 data input unit
22 command input unit
23 control unit
24 output unit
25 storage unit
30 underwater organism imaging aid device
31 detection unit
32 determination unit
33 output unit
100 underwater organism imaging system
500 information processing apparatus
501 CPU
502 ROM
503 RAM
504 program
505 storage device
506 storage medium
507 drive device
508 communication interface
509 communication network
510 input/output interface
511 bus

What is claimed is:

1. An underwater organism imaging aid system comprising:
at least one memory storing instructions; and
at least one processor configured to execute the instructions to:
detect one or more fish from an image acquired by a camera;
when the one or more fish that are detected include a plurality of fish, determine a positional relationship between the plurality of the fish detected and the camera; and
output auxiliary information for moving the camera in such a way that a side face of the plurality of the fish and an imaging face of the camera face each other based on the positional relationship.

2. The underwater organism imaging aid system according to claim 1, wherein the at least one processor is further configured to execute the instructions to:
calculate distances between the camera and respective detected feature points of the plurality of fish, wherein the detected feature points have a related relationship;
obtain a difference between the distances calculated; and
determine that the side face of the plurality of the fish and the imaging face of the camera face each other when the difference obtained is within a predetermined range.

3. The underwater organism imaging aid system according to claim 1, wherein the at least one processor is further configured to execute the instructions to:
determine whether the side face of the plurality of fish and the imaging face of the camera face each other based on an average of respective positional relationships between the plurality of fish and the camera.

4. The underwater organism imaging aid system according to claim 2, wherein the at least one processor is further configured to execute the instructions to:
determine that the side face of the plurality of fish and the imaging face of the camera face each other when an average of the differences obtained for each of the plurality of fish is within a predetermined range.

5. The underwater organism imaging aid system according to claim 1, wherein the at least one processor is further configured to execute the instructions to:
determine that the side face of the plurality of fish and the imaging face of the camera face each other when the side faces of equal to or more than a predetermined number of fish among the plurality of fish and the imaging face of the camera face each other based on respective positional relationships between the plurality of fish and the camera.

6. The underwater organism imaging aid system according to claim 1, wherein the at least one processor is further configured to execute the instructions to:
when determining the positional relationship, weight a heavier weighting for information on fish of the plurality of fish detected in a predetermined region in an area imaged by the camera, the predetermine region corresponding to a distance range from the camera suitable for estimating a size of the fish.

7. The underwater organism imaging aid system according to claim 1, wherein
a plurality of images including the same plurality of fish are used in the determination.

8. The underwater organism imaging aid system according to claim 1, wherein the at least one processor is further configured to execute the instructions to:
determine that a side face of the plurality of fish and an imaging face of the camera are at a position where the side face of the plurality of fish and the imaging face of the camera face each other when an optical axis of the camera and the side face of the plurality of fish perpendicularly or substantially perpendicularly intersect each other.

9. The underwater organism imaging aid system according to claim 1, wherein the at least one processor is further configured to execute the instructions to:
repeat the detection, the determination, and the output until the determination indicates that the a side face of the plurality of fish and the imaging face of the camera face each other.

10. The underwater organism imaging aid system according to claim 1, wherein
the auxiliary information includes an instruction that a controller of the camera moves the camera to a position where the side face of the plurality of fish and the camera face each other.

11. An underwater organism imaging aid system according to claim 1 further comprising:
   a camera configured to capture an underwater image; and
   a display device configured to display auxiliary information for imaging the side face of the plurality of fish, the auxiliary information being configured to be output by the underwater organism imaging aid device.

12. The underwater organism imaging aid system according to claim 11, further comprising
   a camera adjustment device configured to adjust the camera based on the auxiliary information.

13. An underwater organism imaging aid method performed by a computer and comprising:
   detecting one or more fish from an image acquired by a camera;
   when the one or more fish that are detected include a plurality of fish, determining a positional relationship between the plurality of the fish detected and the camera; and
   outputting auxiliary information for moving the camera in such a way that a side face of the plurality of the fish and an imaging face of the camera face each other based on the positional relationship.

14. A non-transitory storage medium storing an underwater organism imaging aid program for causing a computer to execute:
   detecting one or more fish from an image acquired by a camera;
   when the one or more fish that are detected include a plurality of fish, determining a positional relationship between the plurality of the fish detected and the camera; and
   outputting auxiliary information for moving the camera in such a way that a side face of the plurality of the fish and an imaging face of the camera face each other based on the positional relationship.

* * * * *